(No Model.) 3 Sheets—Sheet 1.
C. W. WILLIAMS, E. B. IVES & G. S. BARNUM.
TELEGRAPHIC APPARATUS.
No. 313,462. Patented Mar. 3, 1885.
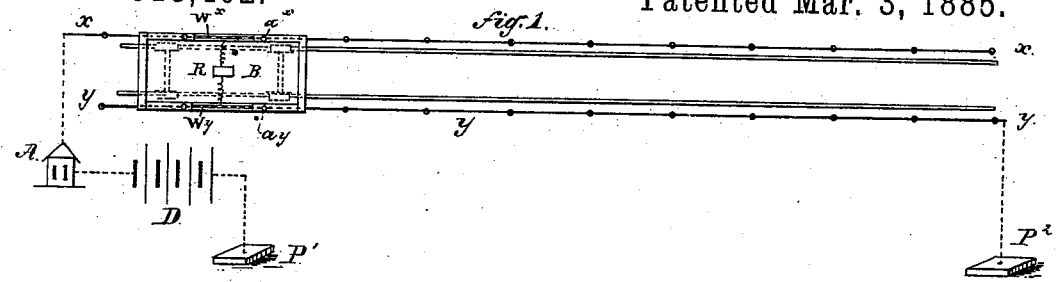
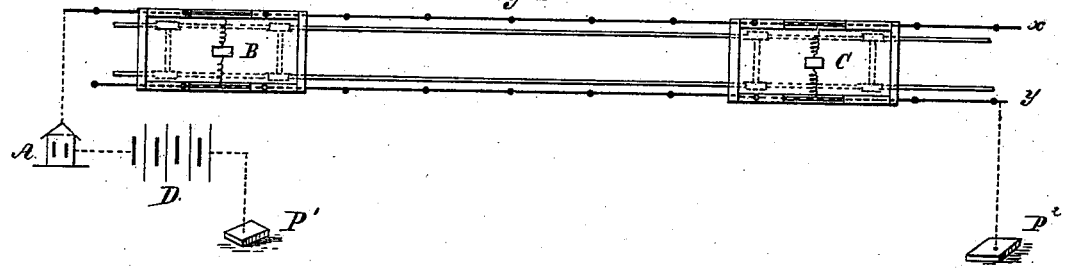
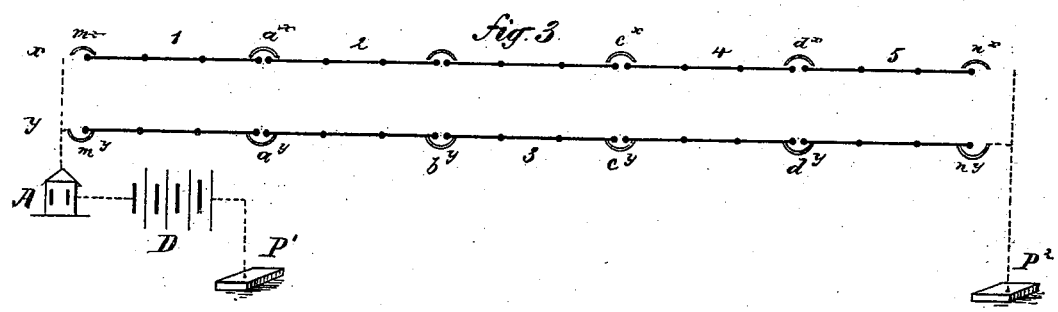
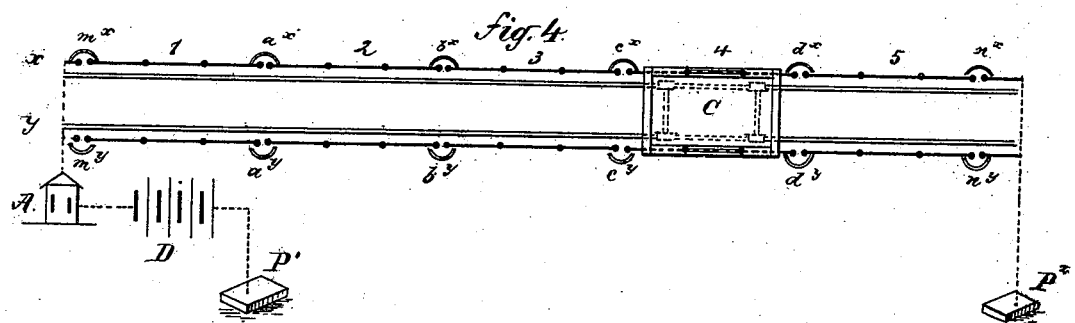
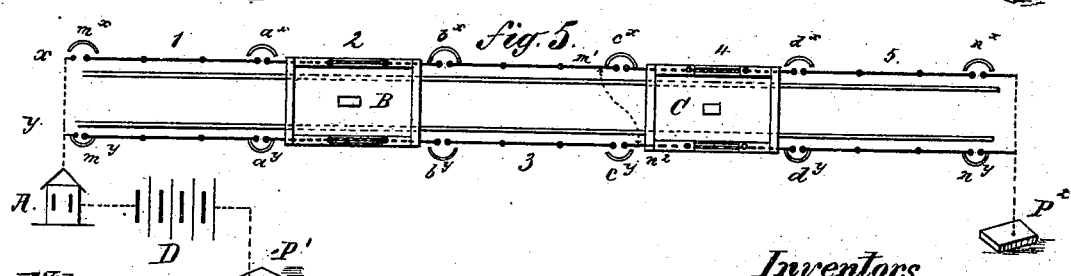
Witnesses:
Inventors
1st Charles W. Williams
3rd George S. Barnum
2nd Edward B. Ives
by J. P. Fitch their atty (No Model.) 3 Sheets—Sheet 2.
C. W. WILLIAMS, E. B. IVES & G. S. BARNUM.
TELEGRAPHIC APPARATUS.
No. 313,462. Patented Mar. 3, 1885.
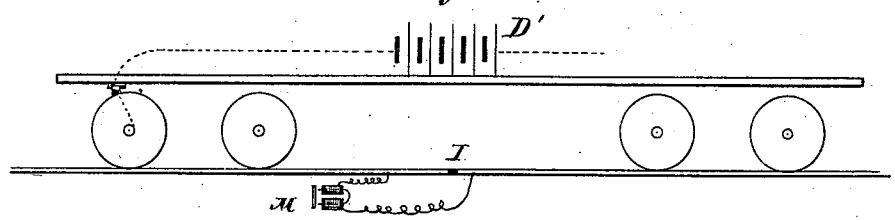
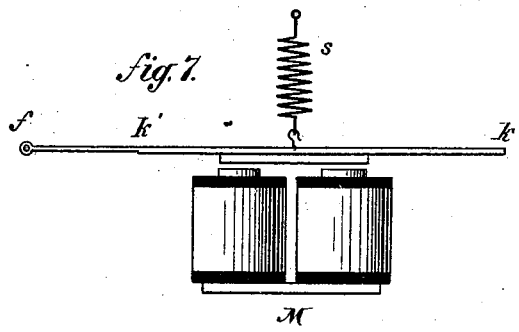
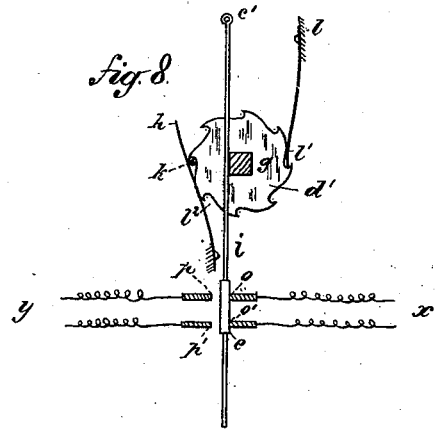
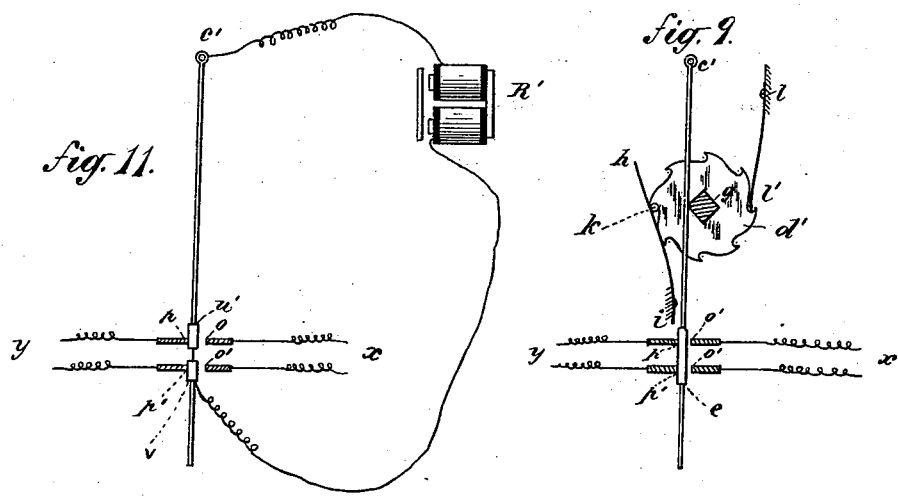
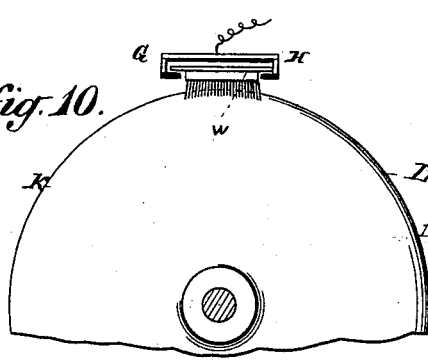
Witnesses:
Inventors

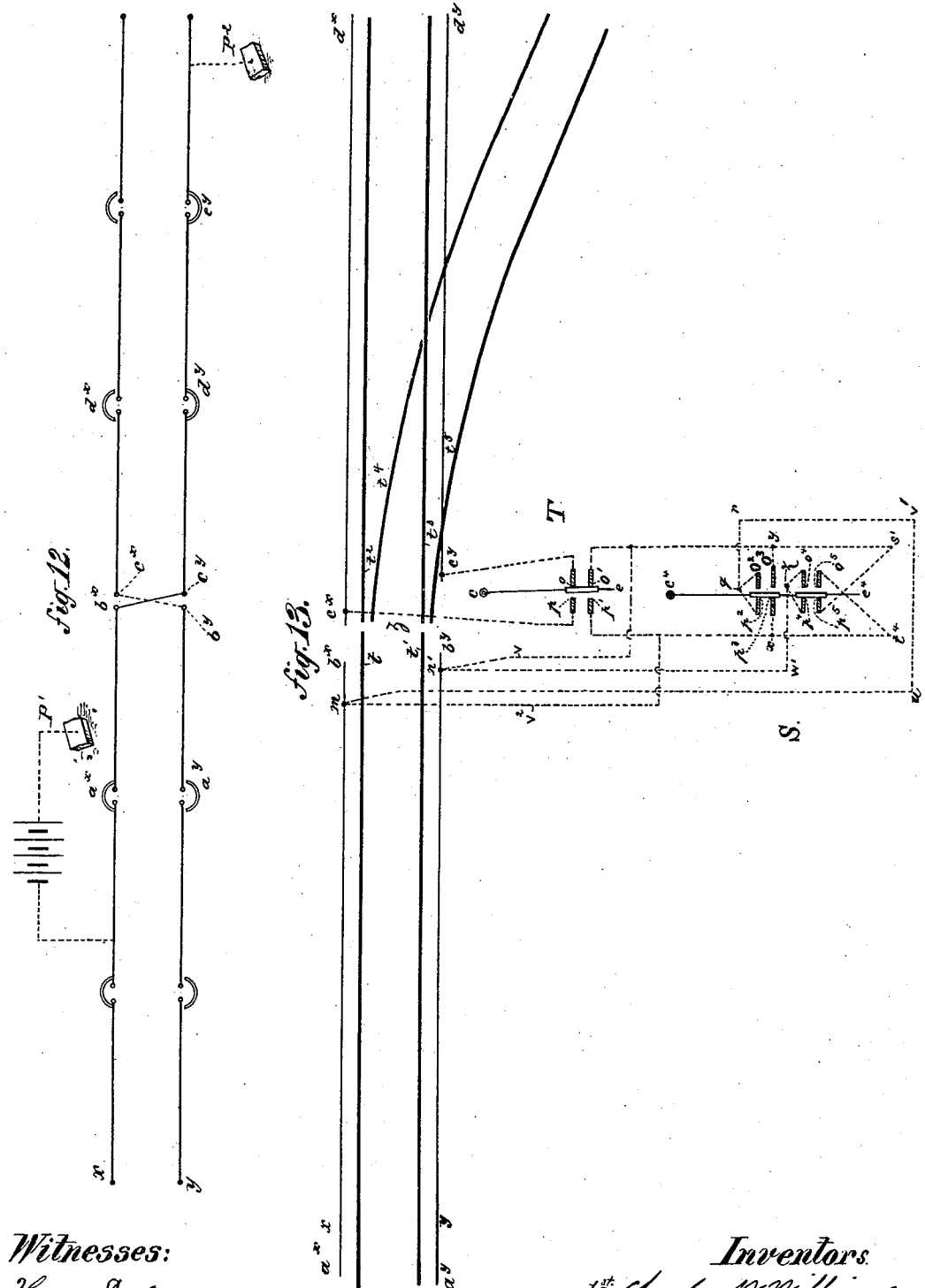

UNITED STATES PATENT OFFICE.

CHARLES W. WILLIAMS, OF CAVE CITY, KENTUCKY, EDWARD B. IVES, OF NEW YORK, N. Y., AND GEORGE S. BARNUM, OF ATLANTA, GEORGIA.

TELEGRAPHIC APPARATUS.

SPECIFICATION forming part of Letters Patent No. 313,462, dated March 3, 1885.

Application filed May 2, 1884. (No model.)

*To all whom it may concern:*

Be it known that we, CHARLES W. WILLIAMS, of Cave City, Barren county, in the State of Kentucky, EDWARD B. IVES, of the city of New York, in the county and State of New York, and GEORGE S. BARNUM, of Atlanta, in the county of Fulton and State of Georgia, the first two citizens of the United States of America, and the latter a subject of the Queen of Great Britain, have invented a new and useful Improvement in a Telegraph for Telegraphing through a Moving Railway-Train, of which the following is a specification, reference being had to the accompanying drawings, forming part of the same, in which—

Figures 1 to 5, inclusive, are plan views of a railroad, along by the sides of the rails of which are stretched the wires of a double telegraphic circuit, by means of which and the devices hereinafter described telegraphic communication is established and maintained through a moving car on the road, the said several figures showing the different positions of the electrical connections between the different sections of the said wires as the car moves over the road, to be particularly described hereinafter. Fig. 6 represents in elevation a car on a railway-track and carrying a galvanic battery, in the circuit of which is a local electro-magnet, the office of which is to actuate a switch, as hereinafter described. Fig. 7 is a side elevation of the local electro-magnet shown in Fig. 6, together with its armature and a vibrating lever connected thereto. Figs. 8 and 9 are side views of a ratchet and cam, which are adapted to be actuated by the vibrating lever shown in Fig. 7, to operate an electric switch, all of which is fully described hereinafter. Fig. 10 is a side elevation of a circuit-breaker, to be described. Fig. 11 is the local electro-magnet at the station, and the switch, herein described, together with the circuit-wire connections. Fig. 12 is a plan view of the railroad and circuit wire, showing a circuit-connection direct between the two wires; and Fig. 13 is a plan view of said road-wires, a side or branch track, and an electric switch, whereby electrical connection is maintained between the main telegraphic line and the telegraph-car on the side or branch track.

Our invention relates to an electric telegraph for telegraphing through a moving train or car on a railroad; and it consists of the devices herein described and claimed.

In carrying out our purpose we employ two main conductors which run parallel to the track, one on either side, suitably insulated on supports in the vicinity of the rails, so that electrical connection may be maintained between a moving car on the track and the wires, as hereinafter described. The said wires are shown in the drawings, and respectively indicated by the letters X Y. Points on these conductors are designated by letters with the exponent $x$ or $y$, as they may happen to be on X or Y. A numerical exponent to X or Y indicates the number of the section. Thus $X^4$ means the conductor X on the fourth section of the line.

The same letters in the several figures refer to corresponding parts.

Both wires X and Y have connected with them at suitable intervals contact-surfaces, as are described and shown in the drawings and specification filed July 10, 1883, in the United States Patent Office, with the joint application of Charles W. Williams, George S. Barnum, and Edward B. Ives, for a patent for maintaining electric connection between moving and stationary electrical instruments, said application having been allowed November 20, 1883, to which reference is here made for a description of said surfaces. The wires X and Y are together connected to one of the poles of the same battery, and are connected together at their other ends and grounded, the wire from the opposite pole of the battery being also grounded, as shown in Fig. 5. The circuit is therefore from the battery through both wires when both are unbroken, and through either when the other is broken, to ground, and by ground back to battery.

Any car of the train, preferably the baggage-car, is provided with two contact-wires, which act in conjunction with the contact-surfaces, as has been described in the above-mentioned specification. The wires from a telegraph-instrument on the car are attached one to each contact-wire, and it is now evident that if X and Y were continuous and were connected one to one pole of a battery and the other to the opposite pole of said battery, through ground at the other end of the line, a current will flow through the instrument on the car as long as the contact-wires are sliding on the contact-surfaces. This is represented in Fig. 1. X and Y are the main conductors. $w^x$ and $w^y$ are the contact-wires. The dots are the contact-surfaces. D is the battery. $P^1$ and $P^2$ are the ground-plates. A is a telegraph-office. B is a telegraph-car, and R is the telegraph-instrument on the said car. The circuit is now: Battery A, X, $a^x$, $w^x$, R, $w^y$, $a^y$, Y, $P^2$, $P^1$, battery, and it is clear that telegraphic communication can be kept up between A and B. Now, suppose a second train containing a telegraphic car comes along. It is evident from the well-known phenomena of electricity that while both relays on the trains B and C might respond to the operator at A, yet neither B nor C could communicate with each other, nor with A, so long as the other's key remained closed. In order, therefore, to apply the system to the existing railroads, a special arrangement of X and Y becomes necessary. They are divided into blocks or sections, and a contact-surface is placed at each end of all the sections of both main conductors, as represented, Fig. 3. The connections between the sections are as represented in double lines, Fig. 3, and the path of the electric current is obvious. This represents the state of affairs before a telegraph-car comes into the system. The object of dividing the conductors into sections is to avoid, as far as possible, the condition above described, and indicated in Fig. 2, and the sectios must be sufficiently short to accomplish this end.

It is observed that at the extremities of the sections all the connections of Y are complete, while all those of X are broken. At these points are placed devices called "key-blocks," the object of which is to automatically change the existing connections, as the car carrying the contact-wires passes from one section into another. Thus when the train enters into block 1 the existing connections are changed, $m^x$ being closed and $m^y$ being broken. It then passes on into section 2, breaking the connection at $a^y$ and establishing it at $a^x$. So on it goes till the train reaches section 4, when the state of affairs is as represented in Fig. 4. The circuit is now from the battery through X to the train, through which it crosses to Y, and thence to ground-plate $P^2$, and so back to the battery. It must be borne in mind that the function of the key-block is to automatically change and reverse the existing state of connections, so when a second train enters the system, as it passes from section to section it restores the connections to their original position, as shown in Fig. 3. The same would have occurred had train C, starting back from section 4, run on backward out of the system. Fig. 5 represents the condition of affairs when a second train has gotten as far as section 2. In this case the current starts from the battery and flows through Y to train B, through which it crosses to X. It flows on through X until it reaches train C, through which it crosses to Y, and thence, as has been described, back to the battery. It is now evident that so long as two or more trains do not come onto the same section, they will be in telegraphic communication with each other and with A.

In order to enable this system of railway-telegraph to be applied to the ordinary existing forms of railroads, a number of circumstances have to be taken into consideration. Means must be provided for allowing a train to run onto a side track, and yet remain in circuit for approaching trains on single-track roads to pass one another; also, means must be provided to allow the local offices along the line of the road to be in the circuit, that they may also be in telegraphic communication with the various trains; but before describing how all this is effected it will be well to describe the key-block, which automatically shifts the connections at the extremities of the sections.

Let Fig. 6 represent the car that carries the contact-surfaces. It carries a battery, D'. The poles of this battery are connected with the front and rear trucks of the car. One of these connections is made by simply attaching the wire to any metallic part of the truck-frame. The other is a special device for a special purpose, both device and purpose to be described hereinafter. The joints of both lines of rails nearest to the ends of the sections of the main conductors are insulated, and an electro-magnet, M, is connected with the rails on either side of the insulated joint I, as represented. Now when the car comes in the position represented in Fig. 6, so that the trucks straddle the insulated joint I, then the current from the battery on the car will evidently flow through the magnet M, the armature will be attracted, and its oscillation will by mechanical means be transformed into a motion that will accomplish the desired result.

To describe the key-block, (see Fig. 7,) the armature of the magnet is attached to an arm, $k'$ $k$. (Shown in section at $k$, Fig. 8.) This arm is fulcrumed at $f$, so as to have a universal motion about that point. The spring $s$ holds the armature away from the poles of the magnet. The arm $k'$ $k$ engages in the teeth of a ratchet-wheel, $d'$, Fig. 8. In this figure $l$ $l'$ is a spring fastened at $l$ to prevent the ratchet-wheel from moving backward. $h$ $i$ is a spring fastened at $i$ to cause the end of the arm $k'$ $k$ to engage the tooth $l^2$ when the arm is drawn down by the armature. $c'$ $e$ is a spring fastened at $c'$, and which carries a platinum or other plate, $e$, which, by pressing against $o$ $o'$ or $p$ $p'$, causes the proper connection to be made. This movement of the spring $c'$ $e$ is caused by a cam, $g$, which turns with the ratchet-wheel $d'$. The shape of this cam is an equilateral regular polygon, and may have half as many sides as the ratchet has teeth, and having its angles opposite every alternate tooth of the said wheel.

The action of the device is as follows: An electrical impulse goes through the magnet, attracting and drawing down the armature. This draws down the arm $k' k$. The point $k$ moves down, bearing against the spring $h\ i$, which causes the point $k$ to engage the tooth $l^2$, Fig. 8. When the current ceases to flow through the magnet the armature is released, and the spring $s$, drawing up the arm $k' k$, draws the tooth $l^2$ to the point indicated in Fig. 9.

$o\ o'$ and $p\ p'$ are four contact-posts, the first two placed on one side of the plate $e$, and the other two on the opposite side thereof, and so arranged relatively thereto that the said plate, when swung with the arm in one direction, will make contact with and electrical connection between one pair of said posts, and when swung in the opposite direction will make contact with and electrical connection between the other pair. These posts are electrically connected, $o$ with Y, as at $c^y\ o'$, by wire $v$ with Y, as at $n'$, $p$ with X, as at $c^x$, and $p'$ with X, as at $m$, by wire $v^2$, as shown in Fig. 13, their other connections being for the present disregarded. The cam $g$ turns with the ratchet-wheel, and the apex of one of the angles presses against the spring $c'\ e$, breaking the connection between $o\ o'$ and establishing one between $p\ p'$. The next electrical impulse will in a similar manner turn the ratchet-wheel through one notch, breaking the connection between $p\ p'$ and establishing one between $o\ o'$, and so on indefinitely. The said ratchet and cam are mounted on a suitable shaft journaled in proper bearings and located in suitable proximity to the said magnet. Electrically connecting $p\ p'$ connects $b^x$ with $c^x$, while connecting $o\ o'$ breaks $b^x\ c^x$ and establishes $b^y\ c^y$. The path of the current from $b^y$ to $c^y$ is shown in Fig. 13. It is $c^y, o, e, o', v, n', b^y$. Should the key-block now be worked the connection at $o\ o'$ would be broken and that between $p\ p'$ established. The path of the current would now be $c^x, p, e, p', v^2, m, b^x$. The key-block thus arranged, which is called "key-block T," may be used at all points on the line except at switches, but I find further advantages (hereinafter pointed out,) to be derived from adding thereto key-block S, (to be described,) and removing wires $v$ and $v^2$.

There is one defect in this key-block, as it stands, that must be eradicated. Supposing the car carrying the battery $D'$, Fig. 6, assumes the position indicated, so as to cause a current of electricity to pass through the magnet M, and then stops and instead of passing on into the next section backs, it is evident that the key-block will have been worked just as if the train had passed on, and the system will then be out of gear, as it were. The only way that this can be eradicated is by causing in some way the armature of the magnet M to give an extra "click" whenever the train changes its direction, no matter in how slight a degree. This is effected by having an arrangement by which at the instant of changing direction the current from the battery $D'$, Fig. 6, is interrupted for an instant. One wire from the battery $D'$ is attached direct to any part of the truck-frame, as has been described. The other is attached to a device shown in Fig. 10. W is a metallic brush sliding on K L, the tread of one of the wheels of the truck. This brush has a slight longitudinal movement in a box, G H, the lining of the sides and top being of an insulating material, but the ends being metallic and in connection with the battery $D'$, Fig. 6. A change in the direction of the motion of the wheel will shift the brush to the other extremity of the box G H, breaking for an instant the current from the battery $D'$.

To place a local office in the circuit the following arrangement of connections becomes necessary in the key-block. The main features remain the same, but the metallic slab $e$, Figs. 8 and 9, which is attached to the arm $c'\ e$, is divided into two parts, $u'$ and $v'$, Fig. 11. These two parts are insulated from each other, except for a wire-connection between them going through the relay in the local office. It is evident that the current flowing from one contact-point $p$ to the other, one must pass through the relay R', Fig. 11.

The switch-block S is composed of a lever, $c^4\ e^4$, pivoted upon a suitable support at $c^4$, so that it may be moved back and forth, and provided with two plates, similar to plate $e$ on lever $c'\ e$, placed near each other, but insulated one from the other. It has also eight contact-posts, $o^2\ o^3\ o^4\ o^5$ and $p^2 p^3 p^4 p^5$, so placed with relation to lever $c^4\ e^4$ that when said lever is swung in one direction one plate thereon will make contact with and electrical connection between $o^2$ and $o^3$, and the other plate thereon will at the same time make contact with and electrical connection between $o^4$ and $o^5$, while when said lever is swung in the other direction one plate thereon will make contact with and electrical connection between $p^2$ and $p^3$, and the other plate thereon will at the same time make contact with and electrical connection between $p^4$ and $p^5$. $o^2$ and $p^2$ are both electrically connected with X at $m$. $o^4$ and $p^4$ are both electrically connected with Y at $n'$. $o^3$ and $p^5$ are both electrically connected with $o'$, and $o^5$ and $p^3$ are both electrically connected with $p'$. When the connections between $p^2$ and $p^3$ and $p^4$ and $p^5$ are closed, the circuit through the double key-block T S will be from one section of one conductor to the next section of the same conductor, as seen in Fig. 13, (wires $v$ and $v^2$ being disregarded,) the path of the current being, when the connection between $o$ and $o'$ is closed, Y at $n', w', z, p^4$, lower plate on $c^4, e^4, p^5, s', o', e, o$, Y, at $c^y$. Swinging $c'\ e$ to the left, thereby breaking the connection between $o$ and $o'$ and making connection between $p$ and $p'$, breaks the circuit between $b^y$ and $c^y$ and closes it between $b^x$ and $c^x$, the path of the current being then X, at $m$, $u$, $v'$, $r$, $q$, $p^2$, upper plate of $c^4 e^4$, $p^3$, $x$, $p'$, $e$, $p$, X at $c^x$.

The use of this switch-board S will now be explained. Suppose, in Fig. 4, for example, that the train should lose one of its contact-wires. The result of this would be to overturn the whole system, for the circuit would be open, the line of communication between X and Y through the car being gone. To provide for this I employ the double switch-block T S, when all that is necessary is to go to the nearest key-block and change the connections at $c$ by shifting the arm $c^4 e^4$, thus breaking the connections between $p^2$ and $p^3$ and $p^4$ and $p^5$, and establishing connections between $o^2$ and $o^3$ and $o^4$ and $o^5$, the effect of which is to break the circuit between $b^y$ and $c^y$ or $b^x$ and $c^x$, as the case may be, and establish a circuit from $b^x$ to $c^y$, or from $b^y$ to $c^x$, as the case may be. Suppose this arm $c^4 e^4$ to have been shifted to the left at the key-block at $c$, Fig. 5, breaking circuit $c^x d^x$ and closing $c^x d^y$. The path of the current would now be battery, $m^x$, $a^x$, $b^x$, $m'$, $u$, $v'$, $r$, $q$, $o^2$, upper plate on $c^4 e^4$, $o^3$, $y$, $o'$, $e$, $o$, $n^2$, $d^y$, $n^y$, P$^2$, P$'$, battery, the key-block at that section being similar to that shown in Fig.13. The use of the key-block S also prevents the break in the circuit that would otherwise occur when a train left the system—for instance, by running off on a side track. When a train regularly leaves the system by leaving the main line at a junction, or some such point, the movement of this arm $c^4 e^4$ may be made automatically, in a manner similar to that of the arm $c' e'$ of the key-block. Suppose at some point, as Z, Fig. 13, the train leaves the system. As soon as the contact-wires had left the contact-surfaces the circuit would be "open," for, as has been explained, all the X-connections behind the train are closed, while in front of the train they are open, the contrary being the case with the Y-connections. The circuit is kept closed by the wire running from one contact-wire to the other through the car, and it is evident that should this car be removed the circuit would stand open, unless there were some way of connecting the X and Y conductors at the point where the car leaves the system. This defect is overcome by automatically connecting the X of one section with the Y of the adjacent one, as shown in Fig.12. The course of the current is then battery, $a^x$, $b^x$, $c^y$, $d^y$, $e^y$, P$^2$, P$'$, battery. The next train that passes over reverses all the connections, as has been described, closing all the Y-connections until B is reached, when the connection between $b^y$ and $c^y$ is broken and one between $c^x$ and $b^y$ is established. If at this point it, like the preceding train, had left the system, then instead of interrupting $b^x c^y$ and establishing $c^x b^y$, $b^x c^y$ would be interrupted and $c^x b^x$ established. If, instead of leaving the system at Z, it had proceeded right on, then the succeeding connections would have been reversed in the usual way.

The manner of accomplishing automatically this shifting of connections can be explained by reference to Fig. 13. T in that figure indicates the contact-points of the regular key-block, the connections being made, as has been described, by the oscillation of the arm $c e$, Fig. 8. J represents the contact-points of another key-block, the connection being made between $o^3$ and $o^2$ and $o^4$ and $o^5$, or between $p^2$ and $p^3$ and $p^4$ and $p^5$, by a similar arrangement. The key-block T is worked when the truck of the car carrying the battery D$'$, Fig. 6, is on the rails $t$ and $t'$ and the other on the rails $t^2$ and $t^3$. The key-block S is worked when one truck stands on the rails $t$ and $t'$ and the other on the rails $t^4$ and $t^5$. In other words, the key-block S is only worked by a car carrying a battery, as described, as it leaves or enters the system. Now, let us suppose that $o o'$, $p^2 p^3$, and $p^4 p^5$ are connected, then $c^y$ will stand connected to $b^y$, as can be seen by tracing the lines of wire represented in Fig. 13. A train passing along the main track interrupts $o o'$ and connects $p p'$, the effect of which is to interrupt $b^y c^y$ and establish $b^x c^x$. If, however, the train has passed onto the switch, key-block S, and not key-block T, would have been worked, $p^2 p^3$ and $p^4 p^5$ would have been broken and $o^2 o^3$ and $o^4 o^5$ established, the result of which would have been to connect $c^y$ with $b^x$. After this, whenever a train passes along the main line, key-block T is worked, the result being to reverse the connections. Thus, if the connections before the train had passed are $c^y b^x$ closed and $c^x b^y$ open, then after the train had passed they would be $c^x b^y$ closed and $c^y b^x$ open. This condition of affairs would continue until key-block S was worked by a train either entering or leaving the system.

For a more particular description of the contact-wires on the telegraph-car, by which connection is made between the car and the contact-surfaces on the circuit-wires, reference is made to the specification and drawings heretofore referred to as filed in the United States Patent Office with the joint application for a patent of Williams, Barnum, and Ives, filed July 10, 1883.

We have not in the foregoing description of our invention described in detail the mechanical construction of the various devices employed, limiting ourselves to specifying in general terms such devices and the necessary electrical connections, as any person skilled in the art will be able from the description given to mechanically construct and adapt the several requisite devices for carrying out our invention.

We have described the line-conductors and contact-wires as placed on opposite sides of the track and car; but it is obvious that both wires might be placed on one side of the track and both contact-wires on one side of the car, care being taken to insulate one from the other, and to so arrange them that one set of contact-wires would run on one conductor and the second on the other.

What we claim as our invention, and desire to secure by Letters Patent, is—

1. The two main-line wires X and Y, branching from the same pole of a local galvanic battery, D, and grounded at the opposite end to complete the circuit, said wires running along parallel to the rails of a railway-track and divided into suitable sections, as described, and provided at each intersection with a switch-connection for breaking and closing the circuit at such intersections, and a railway-car on the track, with suitable means for establishing and maintaining constant electrical connection between said wires through an instrument on the car, also with suitable means, as described, for automatically operating said switches by the movement of the car to open an existing closed connection and close an existing open connection at the intersections passed over by the car, whereby the current is conducted through the car from one wire to the other constantly as the car moves along the track, as and for the purpose specified.

2. The combination, with two sections of the main conductors X and Y, of the described switch, comprising the contact-posts $o$ $o'$ and $p$ $p'$, the vibrating contact-piece $e$, and wire-connections between one pair of said posts and the adjacent ends, respectively, of two sections of one of said main conductors, and between the other pair of said posts and the adjacent ends, respectively, of two sections of the other main conductor, as and for the purpose described.

3. The combination, with two sections of the wires X Y, of the described switch, comprising the contact-points $o$ $o'$ $p$ $p'$ $p^2$ $p^3$ $p^4$ $p^5$ $o^2$ $o^3$ $o^4$ $o^5$, and the vibrating contact-pieces $e$ and $e^t$, together with the circuit-connections connecting $c^x$ with $b^y$, and also $c^y$ with $b^x$, through the said switch, as and for the purpose described.

4. The combination of the described main conductors X and Y and a railway-track divided into insulated sections, a railway-car on said track carrying an independent battery, with wire-connections running from opposite poles of the battery to opposite trucks of the car, an electro-magnet in a line-wire, the opposite ends of which are connected one to each of two adjacent insulated sections of the railway-track, with the described switch-block, whereby, when said car passes a switch-point, said magnet is charged and actuates said switch-block to change the existing main-line circuit at that point, all as and for the purpose specified.

5. The combination, with the electro-magnet M, of an armature, to which is connected a vibrating lever, $k'$, provided with a spiral spring, which acts to withdraw the armature from the magnet, a ratchet-wheel, $d'$, on the shaft of which is the cam $g$, the lever $k'$ and said ratchet being arranged, as described, so that the end of said lever engages the teeth of said ratchet, the spring $h$ acting to insure such engagement, detent $l'$, engaging with the ratchet to prevent its reverse movement, and the lever $c'$, carrying the contact-piece $e$, arranged, as described, in relation to the cam $g$, so that the said lever and contact-piece are vibrated by the rotation of the said cam to make and break connection between the contact-points $o$ $o'$ and between $p$ and $p'$, as and for the purpose described.

6. The combination of the described circuit-breaker W, resting upon the wheel of a railway-car, and a battery on said car, one pole of which is connected to said circuit-breaker and the other pole being in electrical connection with the track, said track being divided into insulated sections and connected to the magnet M, all as and for the purpose described.

CHAS. W. WILLIAMS.

Witnesses:
 C. J. UTHOFF,
 W. T. WILLIAMS.

EDWARD B. IVES.

Witnesses:
 V. HAVARD,
 EUGENE CUSHMAN.

GEO. S. BARNUM.

Witnesses:
 F. W. McCLESKEY,
 H. J. AMBROSE.